United States Patent [19]
Spaller, Jr.

[11] 3,777,610
[45] Dec. 11, 1973

[54] APPARATUS FOR SUPPORTING AND CLAMPING KNIVES ON A ROTARY CUTTER HEAD

[75] Inventor: Albert E. Spaller, Jr., Johnson City, Tenn.

[73] Assignee: Eastman Kodak Company, Rochester, N.Y.

[22] Filed: Oct. 10, 1972

[21] Appl. No.: 296,382

[52] U.S. Cl................. 83/678, 83/346, 83/699, 83/913
[51] Int. Cl................................. D01g 1/04
[58] Field of Search............... 83/666, 674, 678, 83/699, 346, 347, 431, 913

[56] References Cited
UNITED STATES PATENTS
| | | | |
|---|---|---|---|
| 3,485,120 | 12/1969 | Keith | 83/913 X |
| 3,555,947 | 1/1971 | Fram | 83/913 X |
| 3,644,109 | 2/1972 | Klink et al. | 83/913 X |

*Primary Examiner*—Frank T. Yost
*Attorney*—Malcolm G. Dunn et al.

[57] ABSTRACT

A plurality of knives are supported on and clamped to a rotary cutter head by a plurality of similarly formed wedges aligned in contiguous face-to-face relationship to define two endless, spaced apart arrays for clamping opposite end portions of the knives. Each wedge defines within one of its faces a recess for receiving an end portion of a knife, and further defines on its opposite face a keyed surface that interengages within the recess of an adjacent wedge to abut against the received end portion of an adjacent knife. A band member encircles each array for clamping together the wedges of each array. The clamped knives are thereby made more rigid and more resistant to buckling and twisting due to compressive stresses exerted against the cutting edges by yarn or tow being wrapped around the cutter head in contact with the knives prior to cutting; and in one embodiment are the sole support between the upper and lower array of wedges on the cutter head, and in another embodiment may be tensioned to resist buckling due to still greater compressive stresses or significantly large yarns or tows.

12 Claims, 9 Drawing Figures

APPARATUS FOR SUPPORTING AND CLAMPING KNIVES ON A ROTARY CUTTER HEAD

BACKGROUND OF THE INVENTION

The present invention is directed to a rotary cutter head assembly, such as for cutting elongated filamentary yarn into shorter lengths or into staple fiber, and particularly is directed to an improved apparatus for supporting and clamping knives on a rotary cutter head.

When cutting textile and industrial yarn, such as of manmade material, into shorter or staple lengths by a rotary cutter head assembly, and particularly on one wherein the cut lengths pass radially inwardly of and between the adjacent knives on the cutter head for exit from a chamber within the cutter head, the length of the cut lengths is governed by the spacing between adjacent knives. The minimum length possible to be cut on such rotary cutter head is dependent upon the knife mounting arrangement. U.S. Pat. No. 3,485,120 to Keith, U.S. Pat. No. 3,557,648 to Coffin et al and U.S. Pat. No. 2,745,491 to Sonneborn et al are examples of rotary cutter head assemblies wherein the cut fiber lengths exit from within the cutter head in the manner mentioned above.

In U.S. Pat. No. 3,485,120 to Keith a rotary cutting "reel" is disclosed as including a mounting disc and a mounting ring that are secured together in spaced, parallel relationship by a plurality of U-shaped connector lengths which are secured in position as by furnace brazing. A narrow slot extends through the mounting disc, connector length and mounting ring, and a knife blade is mounted within the narrow slot by insertion through one of the radially extending slots formed in the mounting disc. The knife blade rests within the narrow slot with its bottom end portion resting within the slot in the mounting ring and with its cutting edge extending between the mounting disc and mounting ring and facing radially outwardly of the cutting reel. The upper end portions of th knife blades extend above the mounting disc and are protected by an annular cap. The knife blades are readily removable for replacement of a dulled or broken knife blade by removal of the annular cap and by lifting out the defective knife blades. A disadvantage of this construction is that the length of the staple lengths cut depends upon the circumferential spacing between the fixed connector lengths. Also, it is not practical to attempt to cut random length staple fibers by omitting the insertion of some of the knife blades because the cut fiber passing into the interior of the cutting reel would tend to hand up on those connector lengths from which the knife blades had been omitted. It is, therefore, necessary to fabricate a special cutting reel on which the connector lengths are randomly spaced in order to cut random length staple fibers.

In U.S. Pat. No. 3,557,648 to Coffin et al, although not specifically illustrated, since the patented apparatus is assigned to the same assignee as the Keith patent mentioned above, it is known that the knife blades are similarly mounted.

In U.S. Pat. No. 2,745,491 to Sonneborn et al the one end portion of each knife is formed into a rectangular shank that is "socketed" in the cutter hub and is secured therein by a pair of axially spaced radially extending set screws which abut the rectangular shank. The opposite end portion of the knife is unsupported as the knife is supported in cantilevered manner from the cutter hub. There would appear to be a minimal limit to the minimum circumferential spacing possible between the knives and hence to the minimum cut lengths possible due to the necessity for maintaining sufficient thickness of the rectangular shank to support each knife in cantilevered manner; also the set screws have certain dimensions that are essential for holding the knife end portions in place.

Another problem that would be more applicable to the rotary cutter head assemblies of Keith and Coffin et al, since they both concern cutter assemblies wherein the elongated material is first wrapped one or more times around the cutter head in contact with the edges of the knife blades prior to being forced inwardly of the cutting edges in a cutting or severing action, is the tendency after some undetermined period of operation fo one or more of the blades to suddenly buckle due to the high compressive forces exerted upon such knife blades at their cutting edges.

SUMMARY OF THE INVENTION

The present invention relates to a rotary cutter head assembly for cutting elongated filamentary yarn into shorter lengths and provides an apparatus that will support and clamp on a rotary cutter head a plurality of knives in such manner that the knives will be greatly more resistant to buckling under compressive loads that are exerted by yarn being wrapped one or more times around the cutter head in engagement with the cutting edges of the knives and then forced inwardly of the knives in a cutting operation. The apparatus comprises a plurality of similarly formed wedges that are aligned in contiguous face-to-face relationship to define collectively two endless path arrays with each endless path array being supported on the cutter head in spaced apart superposed relationship to further define an upper array and a lower array, as for instance in a horizontally disposed cutter head. In a vertically disposed cutter head, of course, it would be a first array and a second array. Each similarly formed wedge defines within one of its faces a recess that is adapted to receive an end portion of a knife, and further defines on its opposite face a keyed surface that is adapted to interengage within the recess of an adjacent wedge and to abut against the received end portion of an adjacent knife. A band member engages and encircles the collective aligned radially outward presented end surfaces of the assembled wedges in each array. Each band member is provided with an adjustable quickacting clamp for decreasing the length of the band member and thereby drawing the keyed surfaces of the wedges into the adjacent recesses of the wedges and holding the keyed surfaces in tightly clamped abutment with the received end portions of the knives. In this manner the knives are supported and clamped at their opposite end portions in extended position between the upper and lower arrays on the rotary cutter head with the cutting edges facing radially outwardly.

Each wedge is adapted to interfit in readily slidable relationship with an annular supporting shoulder on the rotary cutter head, and may thus define on its end surface that will face radially inwardly an inner notched recess. The annular shoulder thus serves to support the wedges in aligned face-to-face relationship. The notch recesses of the collective aligned wedge array thus define a radially inwardly facing annular groove. The annular supporting shoulder may also be provided with an annular groove that will face radially outwardly for receiving an inner encircling elastic member, such as an O-ring. A portion of the elastic member or O-ring extends from the annular groove beyond the face of the shoulder to be engaged by the radially inwardly facing inner end surface of the wedge notched recess. The elastic member serves to force the assembled wedges radially outwardly into a loosely separated position when the band member is released from clamping position. The elastic member also serves, when the band member is in clamped position, to give some snugness to the clamped array and to absorb any loose play between the wedges.

Each wedge may also define in the end surface that will be facing radially outwardly when supported on the rotary cutter head a notched recess. The collective aligned array of wedges thus defines a radially outwardly facing annular groove formed by all of the notched recesses for receiving therewithin an outer encircling elastic member, such as an O-ring. A portion of the elastic member or O-ring extends from the annular groove beyond the wedge end surface to be engaged by the circling band member. The elastic member serves to loosely hold the wedges in their aligned face-to-face relationship on the annular supporting shoulders of the rotary cutter head, to allow some latitude for adjustment for aligning the different keyed surfaces with their neighboring recess, to provide some holding of the assembled knives in place as one or more knives are inserted or removed, and to transmit uniformly the force from the band member to the wedges when the band member is decreased in length by the adjustable quick-acting clamp. If the size of a wedge is increased in a vertical plane, as assembled on the cutterhead, it may be deemed desirable to have more than one notched recess and more than one O-ring.

By regulating the width of the wedges, and in some instances the thickness of the knives, the length of the cut yarn lengths or staple fiber is regulated. It is also possible by such regulation to obtain very short cut lengths on the order of about 1/16 inch. Since the characteristic cutting operation of the cutter results in uniform cut lengths having square cut end portions without fusing of the end portions, as disclosed in the above-mentioned Keith and Coffin et al patents, the very short cut lengths may be used for flocking and in paper and the like manufactures as well as in textile operations and with longer cut lengths or staple fiber. It is also possible to obtain random cut lengths or staple fiber by spacing the knives around the cutter head as desired, omitting some knives from the arrays where desired. The inner elastic member or O-ring, as previously mentioned, serves to absorb any loose play between the wedges, due either to the presence of all of the knives between the wedges or the absence of some of the knives, whatever the case might be.

The upper and lower arrays of the wedges serve to rigidify the knives when the knives are clamped therebetween and enables the knives to resist buckling against the compressive forces exerted by the yarn, and further enabling the lower support member of the rotary cutter head to be supported and spaced from the upper supporting member by only the clamped knives.

In this instances where it is desired to further resist buckling of the knives due to operating with still larger yarn or yarn tows with attendant increases in forces being exerted against the knives, the upper and lower or first and second support members may be spaced apart and supported on the rotary cutter head in such manner as to move the support members relatively away from each other to adjustably tension the knives. The tensioned knives are thus adapted to resist buckling from still greater stress producing forces.

BRIEF DESCRIPTION OF THE DRAWINGS

In the drawings:

FIG. 1A is a view of a portion of FIG. 1 and illustrating the opposed diverging surfaces presented between the upper and lower arrays of wedges;

DESCRIPTION OF THE PREFERRED EMBODIMENT

In reference to the drawings, and particularly to FIGS. 1, 1A, 2, 3 and 4, 10 designates a portion of a rotary cutter assembly that is provided with a rotary cutter head 12, a rotary pressure wheel 14, a supporting frame 16 for supporting the rotary cutter head and rotary pressure wheel, and a shaft 18 that is operably connected to the rotary cutter head for driving it in rotation, the shaft in turn being connected to a motive power source (not shown). Elongated filamentary yarn or tow 20 enters from the right of the rotary cutter assembly 10 as viewed in FIG. 1 for wrapping one or more times around the rotary cutter head 12 prior to a cutting operation in similar manner as disclosed in the abovementioned Keith and Coffin et al patented cutters. The rotary pressure wheel 14, when used, is adjustable (not shown) toward and away from the cutter head and may be used to determine the size and number of yarn or tow layers wrapped around the cutter head between the cutter head and pressure wheel before cutting commences. When a pressure wheel is used the cutting is usually initiated at the pressure wheel with the force being transmitted through the layer(s) to the filamentary yarn that is in direct contact with the cutting edges of the knives 22 mounted on the cutter head.

Figure 1:
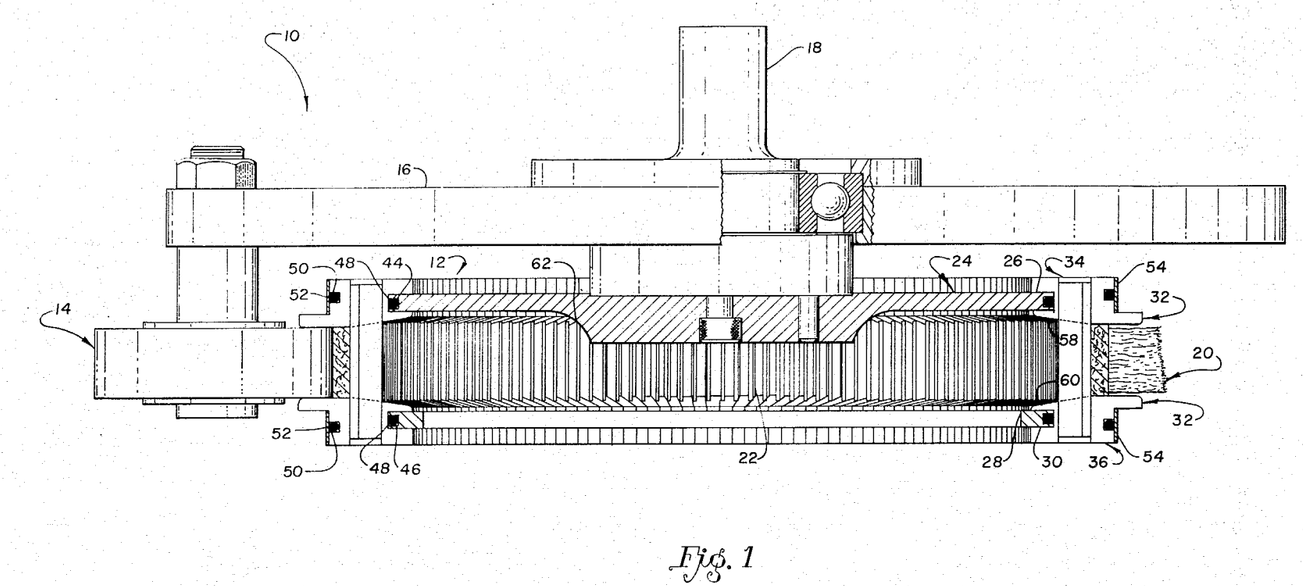
FIG. 1 is an elevational view of a portion of a rotary cutter head assembly showing a pressure roll, and showing the rotary cutter head partly in cross-section with the knives spacing and supporting the lower support member from the upper support member.

In reference, now, specifically to the rotary cutter head 12, the head includes an upper or first support member 24 having an annular shoulder 26 at its radially outer periphery, and a lower or second support member 28 having an annular shoulder 30 at its radially outer periphery. The lower support member is spaced from the upper support member and is supported therefrom solely by the knives 22. The knives are clamped at their opposite end portions by a plurality of similarly formed wedges 32. The wedges are aligned in contiguous face-to-face relationship to collectively define two endless path arrays that in turn define an upper array 34 and a lower array 36.

Figure 2:
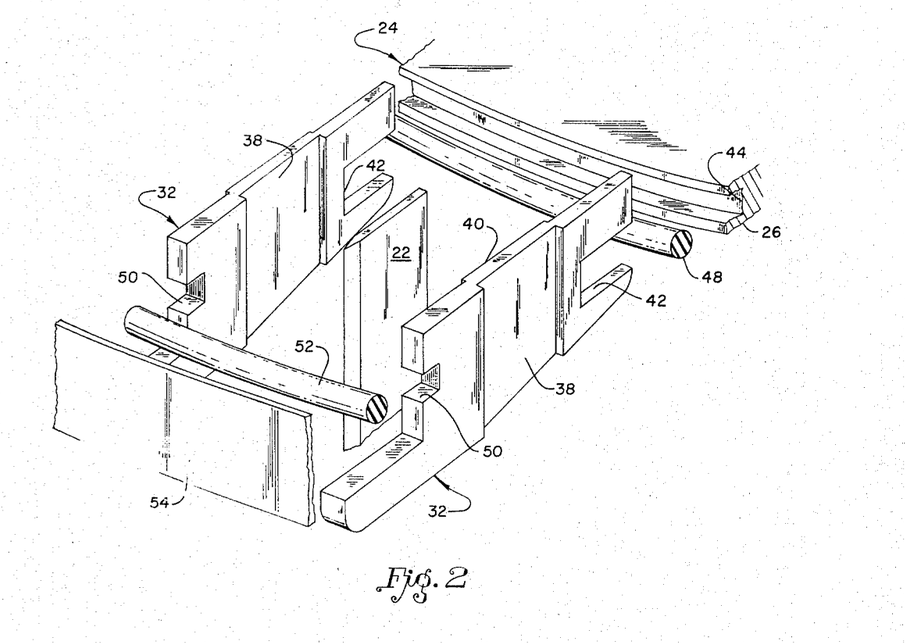
FIG. 2 is an enlarged exploded isometric view showing two of the wedges, a knife located between the two wedges, and portions of a band member, O-rings and a supporting annular shoulder.

Each wedge 32 defines within one of its faces a recess 38 that is adapted to receive an end portion of a knife 22, and further defines on its opposite face a keyed surface 40 that is adapted to interengage within the recess 38 of an adjacent wedge and to abut against the received end portion of an adjacent knife. The taper of the wedge is designated angle A.

Each wedge 32 may also define on its end surface that will face radially inwardly when mounted on the cutter head an inner notched recess 42 (FIG. 2). The notched recess is only one of several possible ways a wedge may be adapted to interfit in readily slidable relationship with an annular shoulder on the rotary cutter head, either annular shoulder 26 of the upper support member 24 or annular shoulder 30 of the lower support member 28. When all of the wedges are collectively aligned in one of the arrays, either upper array 34 or lower array 36, the inner notched recesses together define a radially inwardly facing inner annular groove. The annular supporting shoulder may also be provided with a radially outwardly facing annular groove designated 44 for the upper annular shoulder 26 and designated 46 for the lower annular shoulder. The shoulder annular groove is adapted to receive an inner encircling elastic member such as O-ring designated 48 for each of the upper and lower shoulder annular grooves 44 and 46, respectively. Such inner encircling elastic member may take cross-sectional configurations other than the O-shape of an O-ring. A portion of the elastic member extends from the annular groove of the annular shoulder beyond the face of the annular shoulder to be engaged by the radially inwardly facing inner end surface of the wedge notched recess 42 for purposes that will be described. If desired and deemed practical under the circumstances for the particular design intended, the functions of such elastic members could be replaced by a series of spring members.

Each wedge 32 may also define in the end surface that will be facing radially outwardly when supported on the rotary cutter head an outer notched recess 50. When all of the wedges are assembled and collectively aligned in one of the arrays, either upper or lower arrays, the outer notched recesses together define a radially outwardly facing annular groove for receiving therewithin an outer encircling elastic member such as O-ring designated 52 for each of the upper and lower wedge arrays. A portion of the elastic member or O-ring extends from the annular groove beyond the outer wedge end surface for purposes to be described.

Figure 3:
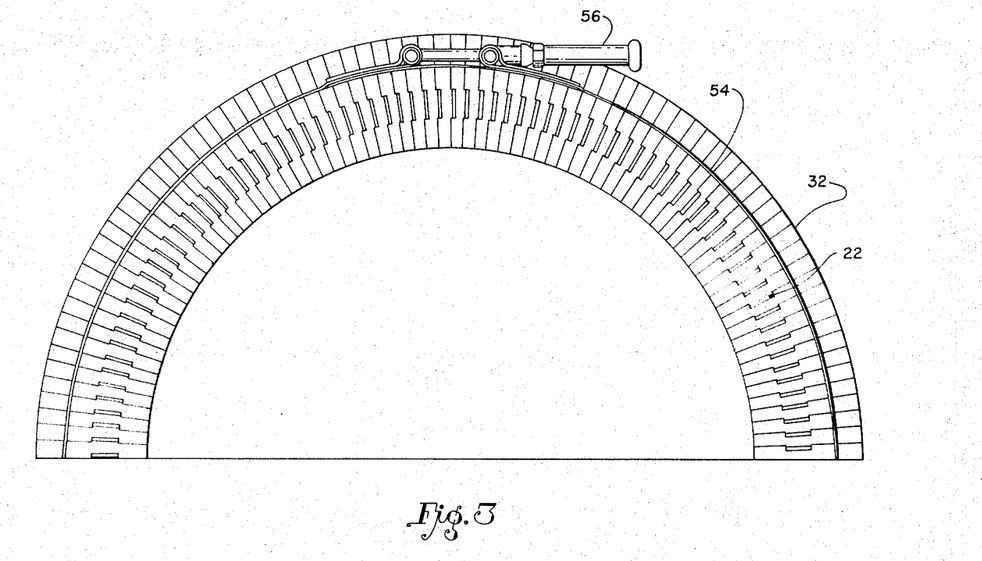
FIG. 3 is a plan view showing the wedges of one-half of one of the arrays held in clamped relation by a band member and an adjustable quick-acting clamp.
Figure 4:
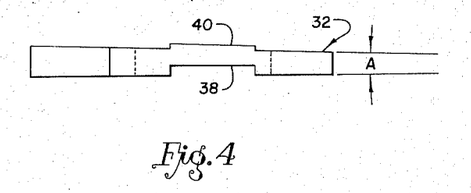
FIG. 4 is a plan view of a wedge illustrating the angle of taper.

A band member, designated 54 for each one in the upper and lower arrays, engages and encircles the collective radially outward presented end surfaces of the aligned wedges for each array of wedges. Each band member is provided with an adjustable quick-acting clamp 56, such as a MARMAN clamp or the like, as shown in FIG. 3. The quick-acting clamp decreases the length of the band member thereby drawing the keyed surfaces of all of the wedges in an array into the adjacent recesses of the wedges and holding the keyed surfaces in tightly clamped abutment with the received end portions of the knives. The knives are thus supported and clamped at their end portions in extended position between the upper and lower arrays on the rotary cutter head so that their cutting edges face radially outwardly between the arrays.

When a band member is shortened in length by the adjustable quick-acting clamp, the clamping force is evenly transmitted to the collective wedges in an array by and through the outer elastic member or O-ring 52, a portion of which extends beyond the outer wedge end surface, as previously mentioned. When the adjustable quick-acting clamp is released, which in turn lengthens a band member, the outer elastic member 52 also serves to loosely hold the wedges in their aligned face-to-face relationship on the respective annular shoulders of the rotary cutter head. In this manner the elastic member allows some latitude for aligning the keyed surfaces with their neighboring recesses, and will serve to provide some holding of the assembled knives in place as one or more knives are inserted or removed.

Also, when a band member is released from clamping engagement the inner elastic member or O-ring 48 serves to force or urge the wedges radially outwardly into a loosely separated position to facilitate knife replacement. Such elastic member 48 also serves to absorb any loose play between the wedges when the band member is in clamping engagement.

The embodiment shown in FIG. 1 thus discloses an arrangement by which the knives are the sole connecting or supporting means between the upper and lower arrays as well as the means for spacing the lower array from the upper array. The wedges, in the manner clamped on either side of the upper and lower end portions of the knives, tend to rigidify the knives, thereby greatly increasing their resistance to compressive stresses along the cutting edges of the knives in a manner that will be discussed in more detail later. The knives when received within the recesses in the faces of the wedges and as clamped are also significantly more resistant to any tendency to twist.

The distance between the cutting edges of adjacent knives determines the length of the yarn cut. The distance can be regulated in one way by removing, for instance, every other knife, or by removing certain knives in irregular order to achieve a random length cut. Another way for regulating the cut length is by changing to wedges having smaller or greater dimensional thicknesses, as the case may be, with the angle A of taper on the face of the wedge correspondingly increasing or decreasing, determined also by the size of the diameter of the rotary cutting head. The only other apparent limitation in decreasing the length of the staple fiber or flock, as the case may be, is the minimum knife thickness possible and whether such minimum thickness would, in assembled or collective array on a cutter head be resistant to buckling due to whatever compressive stresses may be exerted on the cutting edges of the knives by the yarn or tow.

A further feature of the invention concerns the opposed diverging surfaces presented by the upper and lower assembled wedges that enable the cut fiber to flow more freely inwardly of the knives for exit from within the rotary cutter head. In reference to FIG. 1 and particularly to FIG. 1A it will be noted that the diverging surfaces presented by each opposing pair of upper and lower wedges are shown, respectively, at 58 and 60. In this manner the cut fiber is free to expand in the vertical plane as it moves radially inwardly of the cutting edges of the knives.

Still another feature of the invention is the deflecting member 62 located at the central portion of the upper support member 24 on its lower interior surface. The deflecting member extends downwardly within the chamber formed inside the rotary cutter head 12 and serves to deflect the cut fiber downwardly for exit from the cutter head. In this manner the tendency for any cut fiber to hang up on the interior surface of the upper support member is minimized.

Figure 5:
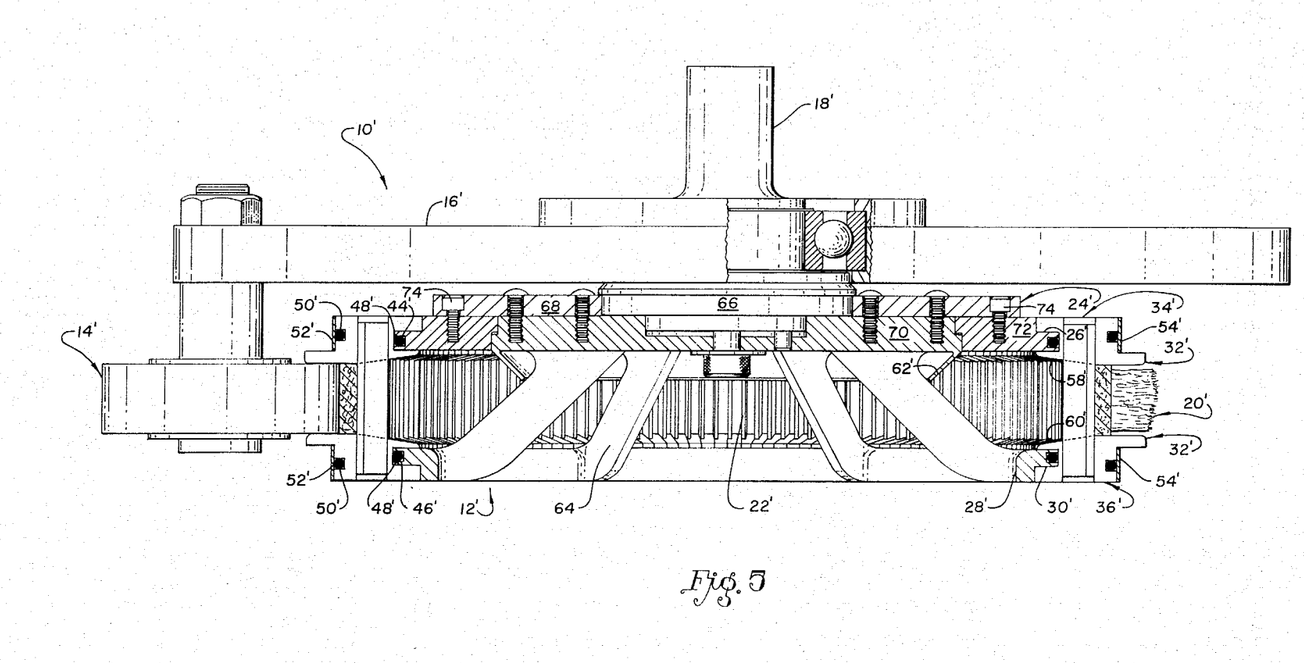
FIG. 5 is a view similar to FIG. 1 but showing another embodiment of a rotary cutter head having connecting structure between the upper and lower support members with the upper support member being axially movable relative to the lower support member for tensioning the clamped knives.

In reference to FIG. 5, another embodiment of the rotary cutter head is disclosed. Those elements that are the same as the ones identified in FIGS. 1, 1A, 2, 3 and 4 are identified by the same reference numbers with prime marks being used after each of the reference numbers.

In the embodiment of FIG. 5 the upper array 34' of wedges 32' is spaced from the lower array 36' by connecting spider legs 64. Specifically, the upper support member 24' includes a hub 66, an annular plate member 68 connected to and encircling the hub, a support plate 70 which is suitably secured to the annular plate member as by bolts, and an upper annular ring 72 which interfits at its inner periphery with the support plate and is suitably fastened to the annular plate as by bolts. The aforementioned spider legs 64 are preferably made integral with the support plate 70 and in turn are preferably made integral with the lower annular ring or lower support member 28'. The upper annular ring 72 is provided with an annular shoulder 26', and the lower support member 28' is provided with an annular shoulder 30' which interfits with the wedges 32' in the manner previously described with respect to the embodiment shown in FIG. 1. The purpose of the interfit between the support plate 70 and the upper annular ring 72 is to enable the upper annular ring to be adjustably moved axially in either direction parallel to the axis of the rotary cutter head to place the knives in tension or release them from such tension, as the case may be. The adjustment is accomplished by means of the adjustment bolts 74 which cause the upper annular ring 72 to move axially relatively to the annular plate 68 and support plate 70. In this manner the knives are placed under or released from tension, and when under tension the knives are adapted to have a still greater resistance to buckling from compressive stresses exerted against the cutting edges of the knives.

The supporting arrangement disclosed in FIG. 5 may be deemed desirable for larger rotary cutting assemblies for cutting extremely large filamentary tows of 600,000 filaments, more or less.

It should be understood that the amount of tensioning placed on a knife depends upon the thickness of the knife. The thinner the knife the more tension required to resist buckling. For very short cut lengths of yarn or tow thinner knives are required, and thus more tension is needed to enable the knives to resist buckling. As the lengths being cut become longer, a thicker knife may be used and thus the knife may require less tension or no tension. In the instance of no tension, the clamping effect of the wedges serves to make the knifes more rigid.

Figure 6:
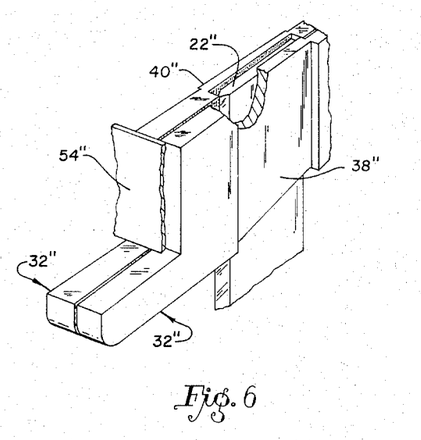
FIG. 6 is an enlarged isometric view of another embodiment illustrating portions of two of the wedges and broken away in part to show the wedges clamped together against a knife with the band member directly abutting the radially outer facing end surfaces of the two wedges.

FIG. 6 discloses another embodiment wherein the wedges 32'' present an outer end surface from which the outer notched recess shown at 50 in FIGS. 1 and 2 has been omitted. The band member 54'' will thus engage and encircle the collective radially outward presented surfaces of the aligned wedges for each array of wedges without the intervening force transmitting elastic member, such as was shown at 52 in the embodiment of FIGS. 1 and 2.

Figure 7:
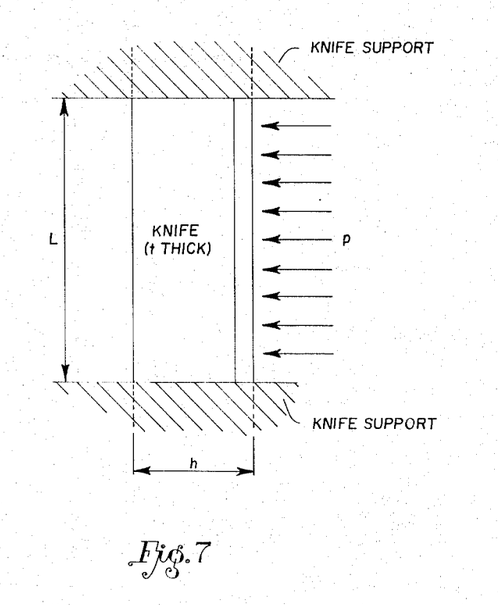
FIG. 7 is a graphic illustration of the compressive load being exerted against the cutting edge of a knife as it is supported.
Figure 8:
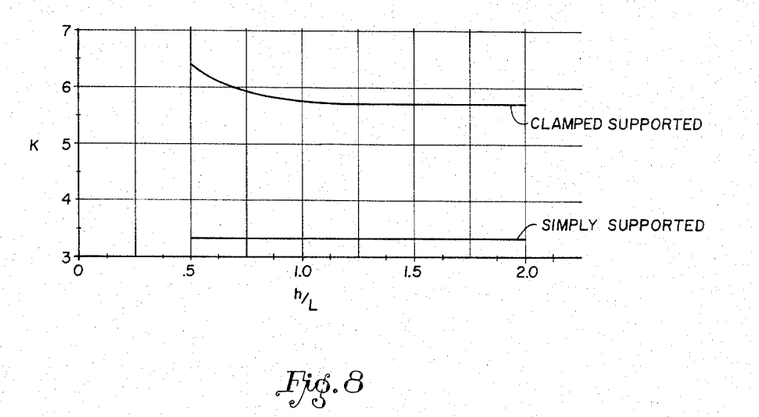
FIG. 8 is an illustration of a graph showing values of K (coefficient determined by type support along h side of knife) versus ratio ($h/L$) (L = being the unsupported length of knife) for two cases: one for freely or simply supported h sides; and other for clamped h sides.

In discussion now of the buckling resistant characteristics of the knives of the embodiments and in reference to FIGS. 7 and 8, the buckling strength of a knife depends largely upon the edge support conditions and the tension applied. Buckling will occur when the compressive stress along the edge of a knife exceeds a certain critical value called the "Critical Buckling Stress".

In reference to FIG. 7, for the case of a knife that is simply supported at its ends, as true in the Keith and Coffin et al patents mentioned previously, the maximum compressive stress at the center of the knife cutting edge for a given load $p$ is $$(\text{sigma}) \; S = \frac{Mc}{I} = \frac{\left(\frac{pL^2}{8}\right)\left(\frac{h}{2}\right)}{\left(\frac{th^3}{12}\right)} = \frac{3pL^2}{4th^2} \quad (1)$$

wherein $S$ = compressive stress
$M$ = bending movement
$c$ = half width of knife
$I$ = section modulus
$p$ = applied uniform load
$L$ = unsupported length of knife
$t$ = knife thickness
$h$ = width of knife In the case of a knife that is clamped at its end portions, the maximum compressive stress at the center of the cutting edge of the knife for a given load p is $$S = \frac{Mc}{I} = \frac{\left(\frac{1}{24}pL^2\right)\frac{h}{2}}{\left(\frac{th^3}{12}\right)} = \frac{1pL^2}{4th^2} \quad (2)$$

In the case of a knife that is clamped at its end portion and is also placed under a tensile load W, the maximum compressive stress is $$S = (pL/4th^2) - (W/th)$$

(3)

The critical buckling stress $S_{cr}$ is* (*Roark Formulas For Stress & Strain, Fourth Edition, McGraw-Hill, N.Y., Page 348)

$$S_{cr} = K [Et/L(1-v^2)] \quad (4)$$

wherein
E = modulus of elasticity
v = Poisson's ratio
t = thickness
L = unsupported length of knife
K = coefficient determined by type support along the h side of knife.

Values of K versus ratio (h/L) are shown in the graph in FIG. 8 for two cases: one for simply supported h sides; the other for clamped h sides.

From equations (1) and (2) it is evident that for a given load p, the conpressive stress on the center cutting edge of the knife with the knife simply being supported would be three times as great as it is in the case where the knife is clamped at its end portions. In the case where the knife is clamped and tensioned, as from equation (3), the stress ratio would be even greater than three. From FIG. 8 it is evident that the critical buckling load for the condition where the end portions are clamped is about 1 ¾ times as great as for the simply supported case; therefore it is evident that a knife which is clamped and tensioned or merely clamped could withstand a load p over five times as much as a knife simply supported.

While the invention has been described in detail with particular references to preferred embodiments thereof, it will be understood that variations and modifications can be effected within the spirit and scope of the invention as described hereinabove and as defined in the appended claims.

I claim:

1. Apparatus for supporting and clamping a plurality of knives on a rotary cutter head for cutting elongated material into shorter lengths, said apparatus comprising:
a plurality of wedges aligned in contiguous face-to-face relationship to define two endless path arrays;
means for supporting each endless path array on the rotary cutter head in spaced apart superposed relationship to define an upper array and a lower array;
a plurality of knives disposed between the upper and lower arrays having their cutting edges facing radially outwardly from the rotary cutter head and having their opposite end portions disposed between and supported by adjacent pairs of wedges, the wedges being adapted to be moved in clamping relation with the end portions of the knives; and
means for moving the wedges into clamping relation with the end portions of the knives.

2. Apparatus as defined in claim 1, and further comprising means for moving one of the arrays axially away from the other array for placing the clamped knives under a tensile load.

3. Apparatus for supporting and clamping a plurality of knives on a rotary cutter head for cutting elongated material into shorter lengths, said apparatus comprising:
a plurality of similarly formed wedges aligned in contiguous face-to-face relationship to define two endless path arrays;
means for supporting each endless path array on the rotary cutter head in spaced apart superposed relationship to define an upper array and a lower array;
each wedge defining in one of its faces a recess adapted to receive an end portion of a knife and defining on its opposite face a keyed surface adapted to interengage within the recess of an adjacent wedge and to abut against the received end portion of an adjacent knife; and
means for drawing the keyed surfaces of the wedges of each array into the adjacent recesses and holding the keyed surfaces in clamping abutment with the received end portions of the knives thereby supporting and clamping the knives at their opposite end portions in extended position between the upper and lower arrays on the rotary cutter head.

4. Apparatus as defined in claim 3, and wherein each wedge defines in its radially inwardly facing end surface when aligned on the cutter head a notched recess, and said means for supporting includes means for interengaging within the notched recess of each wedge for supporting and holding the wedges on the rotary cutter head.

5. Apparatus as defined in claim 3, and wherein each wedge defines in its radially outwardly facing end surface when aligned on the cutter head a notched recess, and said means for drawing and holding the keyed surfaces includes means for being received within said notched recess and adapted to loosely hold the wedges in their aligned face-to-face relationship.

6. Apparatus as defined in claim 4, and wherein said notched recess faces radially inwardly of the rotary cutter head and said means for interengaging within the notched recess includes a resilient member adapted to urge each wedge radially outwardly.

7. Apparatus as defined in claim 5, and wherein said notched recess faces radially outwardly of the rotary cutter head, and said means for drawing and holding the keyed surfaces further includes band members each encircling a wedge array and adapted to abut against the means received within said notched recess and transmit a clamping force through the last said means to the wedges in an array.

8. Apparatus as defined in claim 3, and wherein said means for supporting each endless path array includes a plurality of knives, the knives also being adapted to connect the lower array to the upper array and thereby space the lower array from the upper array.

9. Apparatus as defined in claim 3, and wherein said means for supporting each endless path array includes means for axially moving one of the endless path arrays away from the other endless path array and thereby adjustably tensioning the knives.

10. Apparatus as defined in claim 3, and wherein said means for supporting each endless path array on the rotary cutting head includes an upper support member and a lower support member, each support member defining at its outer periphery an annular shoulder, and the wedges being adapted to interfit in readily slidable relationship with the annular shoulders.

11. Apparatus as defined in claim 10, and wherein said upper support member includes an axially movable member on which an annular shoulder is located at its outer periphery, and means for moving said axially movable member for adjustably tensioning the knives.

12. Apparatus as defined in claim 3, and wherein the upper and lower arrays of wedges define opposed diverging surfaces thereby allowing for expansion of cut shorter lengths of material in a vertical plane as the cut material moves inwardly of the knives.

* * * * *